UNITED STATES PATENT OFFICE.

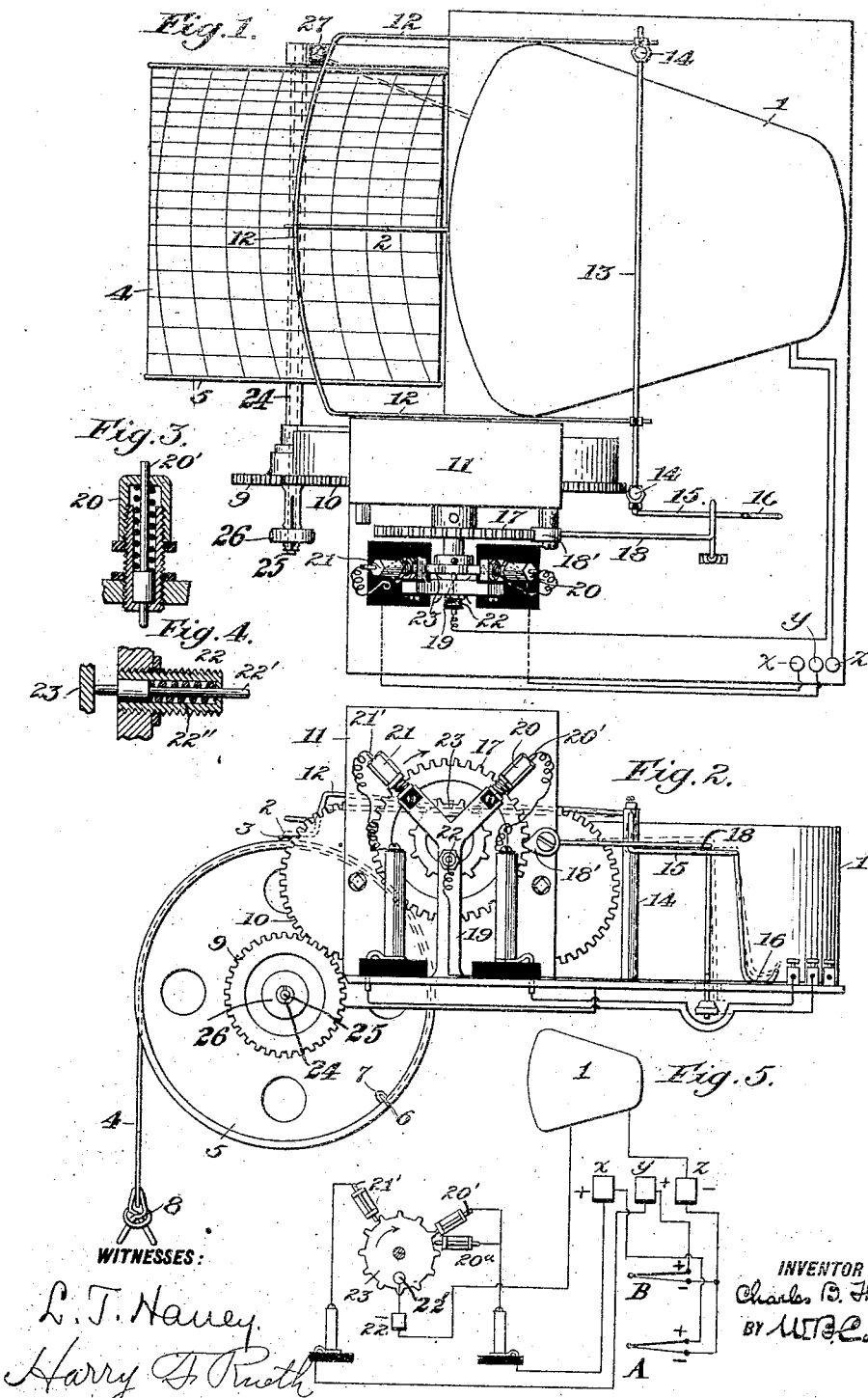

CHARLES B. THWING, OF PHILADELPHIA, PENNSYLVANIA.

RECORDER FOR ELECTRICAL MEASURING INSTRUMENTS.

No. 923,606.      Specification of Letters Patent.      Patented June 1, 1909.

Application filed June 29, 1908. Serial No. 440,844.

*To all whom it may concern:*

Be it known that I, CHARLES B. THWING, a citizen of the United States, residing at Philadelphia, in the county of Philadelphia and State of Pennsylvania, have invented a new and useful Improvement in Recorders for Electrical Measuring Instruments, of which the following is a specification.

My invention relates to an improvement in recorders for recording the readings of galvanometers and other electrical measuring instruments, and is designed especially for use with electrical pyrometers, the form shown and described being designed for use with thermo-electric couples.

I will now describe my invention so that others skilled in the art may manufacture and use the same, reference being had to the accompanying drawing, forming part of this specification, in which—

Figure 1 is a top plan view of my improved recorder. Fig. 2 is a side elevation of the same. Figs. 3 and 4 are detail views of the contacts. Fig. 5 is a diagrammatic view showing also a modification whereby the readings of two instruments may be shown in different manner on the recording sheet.

Like symbols of reference indicate like parts in each.

In the drawings, 1 represents a galvanometer, preferably of the type shown in my Patent No. 870,803, the pointer 2 of which carries at its outer extremity a metal point 3, which, when inked in the manner hereinafter described, is depressed upon a moving sheet 4 making a series of dots or marks thereon which by their position with relation to the scale on the sheet 4 provide a record of the temperature at successive regular intervals of time to which the instrument is adjusted. The record sheet 4 is carried forward at a uniform rate of speed on a drum 5, to which it is attached by sliding the sheet into a slot 6 in the drum. A metal binding clamp 7 retains the sheet on the drum against the pull of the weight 8 clamped to it for the purpose of keeping it taut. This arrangement presents continuously to view all that portion of the sheet upon which a record has been made. The drum is driven by a gear-wheel 9, actuated by the gear-wheel 10 of a suitable clock-work mechanism 11, which also actuates the printing mechanism and the mechanism for opening and closing the electrical circuit or circuits in the manner hereinafter set forth.

12 is a bail mounted on and adapted to follow the movements of a shaft 13 supported by standards 14, the said shaft being bent downwardly to form a counterpoise 15 for the bail and a stop 16 to limit the downward movement of the counterpoise and in consequence the upward movement of the bail.

17 is a gear-wheel actuated by the clock-work mechanism, and 18 is a weighted lever adapted normally to rest upon and depress the counterpoise 15. The lever 18 is provided with a dog 18', adapted to be moved by the teeth of the gear-wheel 17.

19 is a standard having mounted thereon and suitably insulated therefrom contact posts 20, 21, provided with spring-actuated contacts 20', 21'. 22 is a third contact post mounted on the standard 19, and provided with a contact 22' which is always held by means of the spring 22'' against a metallic gear-wheel 23, through which the various circuits are made as hereinafter explained. The contact 22' is always in circuit with the galvanometer.

The drum 5 is attached to a sleeve 24, which is made fast to a shaft 25 by a screw-clutch 26, so that the drum may be released and rotated when a new record sheet is inserted and set in correct position to bring the proper hour mark at the side of the sheet under the pointer.

The leads from the thermo-electric couple A are connected to the contact-posts $x$ and $z$, $x$ being in turn connected to the contact 20' and $z$ to the galvanometer. The leads from the thermo-electric couple B are connected to the contact-posts $y$ and $z$, contact-post $y$ being connected to the contact post 19'.

The operation of my improved recorder is as follows:—In the position shown in Fig. 2 the spring-contact 21' is shown as resting upon and contacting with one of the teeth of the contact-wheel 23. The current then passes from the couple B to the binding post $y$, to the contact 21', through the contact-wheel 23 to the contact 22', from there to the galvanometer, and to the binding-post $z$ and back to the couple B. Current thus passing through the galvanometer coil, the needle or pointer 2 thereof will be swung to the proper position over the record sheet. Just at this moment one of the teeth of the gear-wheel 17 will depress the dog 18', thus raising the lever 18 which will release the counterpoise 15 and the bail 12 will by reason of its own weight descend upon the pointer 2, causing the point or printer 3 thereof to make a dot on the sheet 4, making the proper record for the couple B. When the dog 18' is released from engagement with the said tooth of the wheel 17, it will fall back into the space following said tooth, and the lever 18 will descend against the counterpoise 15 and raise the bail 12 from the pointer. Just about this time the tooth on the contact-wheel 23 will pass from under the contact 21' and the circuit through the galvanometer will be broken, causing the pointer to swing to null position over a pad or other inking means 27. Through a movement of the dog 18' and lever 18 similar to that just described the bail 12 is again permitted to descend upon the pointer pressing the printer 3 against the inking pad. The bail is then again raised from the pointer as above described. By this time one of the teeth of the contact wheel 23 has come under and made contact with the spring contact rod 20', and the circuit of the couple A is completed, the current passing from A to binding post $x$, to contact 20' to contact-wheel 23, to contact 22', to the galvanometer, and back to the couple A through the binding post $z$ common to both couples. When the circuit of the couple A is thus closed, the pointer 2 and its printer 3 are again depressed in the manner before described and another dot is made on the sheet 4, making the proper record for the couple A. In this manner the records for the two couples are constantly and regularly made on the sheet and may be seen at a glance at any time.

It will be apparent of course that one couple may be cut out and the record of the other taken alone.

To prevent confusion on the sheet when the record of a plurality of couples is being made, it may be found desirable to differentiate between the form of the two records on the sheet. This may be done by placing another contact 20ª in such close proximity to the contact 20') and connected to the same wire) that the contact-wheel 23 will make and break contact therewith before contacting with the contact 21'. This will cause the pointer to make two closely-adjacent dots for the record of the couple A, and individual separated dots for the couple B, thus readily distinguishing the records of the two couples.

The advantages of my invention will be readily appreciated by those skilled in the art. The device is simple in character, inexpensive to manufacture and maintain, and does not readily get out of order.

I claim:—

1. In an automatic recorder, the combination of means for imparting regular motion to a recording sheet, an electrical measuring instrument, a deflectable indicator operated by said instrument and carrying printing mechanism, inking means located at one side of the recording sheet, means for opening and closing the electrical circuit through the instrument, and means when the circuit is open for bringing the printing mechanism in contact with the inking means and when the circuit is closed for bringing the printing mechanism against said recording sheet.

2. In an automatic recorder, the combination of mechanism for imparting regular motion to a recording surface, an electrical measuring instrument, a deflectable indicator operated by said electrical measuring instrument and carrying a printing device, inking means, means operated by said mechanism for opening and closing the electrical circuit through the measuring instrument, and mechanical means also operated by said mechanism for bringing the printing device in contact with the inking means when the circuit is open and against the recording surface when the circuit is closed.

3. In an automatic recorder, the combination of mechanism for imparting regular motion to a recording surface, an electrical measuring instrument, a deflectable indicator operated by said measuring instrument and carrying a printing device, inking means, contacts in circuit with the measuring instrument, a contact-wheel operated by said mechanism for opening and closing the circuit through said contacts, and means also operated by said mechanism for moving the printing device against the inking means when the circuit is open and against the recording surface when the circuit is closed.

4. In an automatic recorder, the combination of mechanism for imparting regular motion to a recording surface, an electrical measuring instrument, a deflectable indicator operated by said measuring instrument and carrying a printing device, inking means, contacts in circuit with the measuring instrument, a contact-wheel operated by said mechanism for opening and closing the circuit through said contacts, a bail located over the indicator and normally tending when permitted to depress the printing device against the inking means or against the recording surface, and a lever operated by said mechanism for raising said bail out of contact with the indicator.

5. In an automatic recorder, the combination of clock-work mechanism for imparting regular motion to a recording surface, a galvanometer in a plurality of electric circuits, a deflectable indicator arm operated by the galvanometer and carrying a printing device, inking means, contacts in circuit with the galvanometer and the plurality of electrical circuits, a contact-wheel operated by said clock-work mechanism for opening and closing said circuits alternately through said contacts, and means also operated by said clock-work mechanism for moving the printing device against the inking means when either circuit is opened and against the recording surface when either circuit is closed.

6. In an automatic recorder, the combination of clock-work mechanism for imparting regular motion to a recording surface, a galvanometer in a plurality of electric circuits, a deflectable indicator arm operated by the galvanometer and carrying a printing device, inking means, contacts in circuit with the galvanometer and the plurality of electric circuits, a contact-wheel operated by said clock-work mechanism by means of which one circuit is opened and closed through said contacts a greater number of times than the other, and means also operated by said clock-work mechanism for moving the printing device against the inking means when either circuit is opened and against the recording surface when either circuit is closed, whereby distinguishable records of the two circuits are made on the recording surface.

In testimony whereof I have hereunto set my hand.

CHARLES B. THWING.

Witnesses:
Geo. A. Bass,
A. B. Ames.